United States Patent Office.

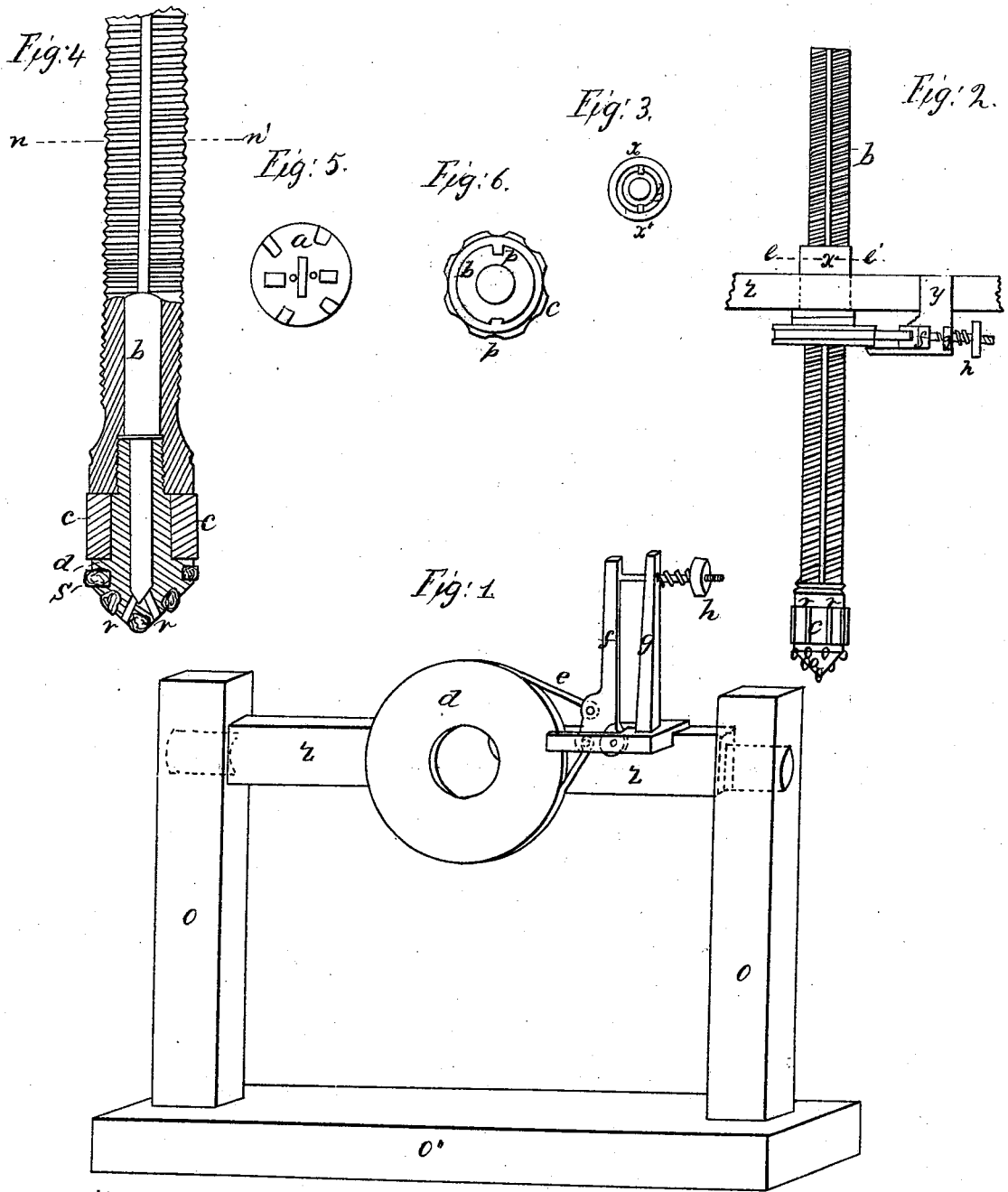

GEORGE F. CASE, OF NEW YORK, N. Y.

Letters Patent No. 92,014, dated June 29, 1869.

---

IMPROVED ROCK-DRILL.

---

The Schedule referred to in these Letters Patent and making part of the same.

---

*To all whom it may concern:*

Be it known that I, GEORGE F. CASE, of the city, county, and State of New York, have invented a new and useful Improvement in Drills for Boring Rock; and I do hereby declare that the following is a full and exact description thereof, reference being had to the accompanying drawings, and to the letters of reference marked thereon.

Figure 1 is a perspective view of a section of the machine with the drill-rod removed.

Figure 2 is a plan with the frame removed.

Figure 3 is a cross-section through the line $b\ b$ of fig. 2.

Figure 4 is a longitudinal section of the drill-head, collar, and portion of the drill-rod.

Figure 5 is an end view of drill-head.

Figure 6 is a cross-section of the drill-rod, through the line $n\ n'$ of fig. 4.

The same letters of reference refer to like parts in each figure.

To enable others skilled in the art to make and use my invention I will proceed to describe its construction and operation.

The drill-head is made of any suitable metal, and constructed in any form adapted to the object in view.

The diamonds or stones S S are firmly set in the drill-head, miscellaneously over its face, but are so adjusted that the entire rock is cut away, in space equal to the dimension of the drill-head.

The drill-rod $b$ is hollow, and when in operation, a current of water is passed through the rod, and out at $r\ r$, fig. 4, serving the twofold purpose of cooling the diamonds and washing out the rock as it is cut away.

The water and washings escape at $r\ r$, fig. 2.

A loose collar, C C, is placed upon the drill-head, as shown in figs. 2 and 4, the collar being of size fitted to fill the hole cut by the drill, and pass down within it, and may be of such convenient length as will adapt it to the dimensions of the drill-head.

The drill-rod has a longitudinal groove, $p$, on either side, into which fit the small projections or keys $x'\ x''$, fig. 3, as the rod is put through the nut $d$ preparatory to operation.

The drill-rod is acted upon by the nut $d$, which, working in the thread in the drill-rod, moves forward the rod as the rock is cut away by the drill.

The nut $d$ is clasped by the friction-band E, and by it is held more or less firmly when in operation.

The degree of friction applied through the band E is regulated by the action of the lever F.

The end of the friction-band E is secured to the lever F, and the lever itself is regulated by the screw-rod, which passes through the standard G.

The screw-rod is adjusted by the nut $h$.

Between the nut $h$ and the standard G is a spiral spring. The action of the spring, when the nut $h$ is turned, causes an extension of the rod toward the lever F, thereby pushing forward the extreme end of the lever, and throwing back the counter-end of the lever, contracts the friction-band, causing it to bind more closely the nut $d$.

When the friction-band is held firmly, it prevents any movement of the nut $d$, and the drill-rod is thereby impelled forward, and the cutting-process of the drill augmented.

The standard G and friction-band E are supported and held in position by an arm, $y$, projected from the shaft $z$, a collar, $x$, with keys, which fit into the longitudinal grooves $r\ r$ in the drill-rod, and whenever it is set in motion by a propelling-power, the drill-rod is carried in rotation with it.

The operation of my machine is simple.

The drill-rod is adjusted to its place, and force applied to the collar $x$, which is thereby given a rotary motion, and the rod moving with it, forces the drill-head against the rock.

The rate of descent of the drill-rod is regulated by the friction-band E. To increase the speed, this is tightened. To lessen it, the band is loosened.

A stream of water, by any suitable manner of application, is passed through the drill-rod, coming out through the drill-head, cooling the diamonds, and washing out, through the grooves in the guide C, the rock-cuttings.

The drill-head is guided by the collar C, and held rigidly to a direct line. The drill-head rotates in the guide, and cannot deflect in any direction.

Power is applied to the propulsion of the drill in any convenient and practical manner.

The advantage of my improvement is obvious. It works with great facility, cutting the rock clean. The diamonds or stones used are practically indestructible.

This drill exceeds all others in durability, in the amount of work it is capable of performing, and in the facility with which it is worked.

What I claim as my invention, and desire to secure by Letters Patent, is—

1. The combination of the drill-rod $b$ with the sleeve or collar $x$, nut $d$, and friction-band E, substantially as shown.

2. The friction-band E, lever F, standard G, and nut $h$, with connections, in combination with the friction-wheel $d$, when arranged substantially as shown and for the purpose specified.

3. The shaft $z$, in combination with the sleeve $x$ and drill-rod $b$, and friction-wheel or band, as and for the purpose specified.

4. The loose collar C, with or without grooves, when placed upon the drill-head, as and for the purpose specified.

GEORGE F. CASE.

Witnesses:
GEORGE B. MAKINS,
SANFORD T. POMEROY.